(12) United States Patent
Cyrén et al.

(10) Patent No.: US 9,835,236 B2
(45) Date of Patent: Dec. 5, 2017

(54) LINEAR ACTUATOR ASSEMBLY

(71) Applicant: Kongsberg Automotive AB, Mullsjö (SE)

(72) Inventors: Bengt Cyrén, Svanesund (SE); Bengt Hermansson, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 516 days.

(21) Appl. No.: 14/359,669

(22) PCT Filed: Nov. 21, 2012

(86) PCT No.: PCT/IB2012/002431
§ 371 (c)(1),
(2) Date: May 21, 2014

(87) PCT Pub. No.: WO2013/076557
PCT Pub. Date: May 30, 2013

(65) Prior Publication Data
US 2014/0298980 A1    Oct. 9, 2014

Related U.S. Application Data

(60) Provisional application No. 61/562,149, filed on Nov. 21, 2011.

(51) Int. Cl.
*F16H 25/20*    (2006.01)

(52) U.S. Cl.
CPC ......... *F16H 25/20* (2013.01); *F16H 25/2015* (2013.01); *F16H 2025/204* (2013.01);
(Continued)

(58) Field of Classification Search
CPC ................. F16H 25/20; F16H 25/2015; F16H 2025/204; F16H 2025/2046; F16H 2025/2062
(Continued)

(56) References Cited

U.S. PATENT DOCUMENTS 3,592,070 A * 7/1971 Hammond ................ B66F 3/10
74/89.35
4,137,784 A    2/1979 Griffin
(Continued)

FOREIGN PATENT DOCUMENTS

EP    0 831 250 A2    3/1998
EP    1 056 961 B1    4/2003
(Continued)

OTHER PUBLICATIONS

English language abstract for EP1767439 extracted from espacenet.com on May 20, 2014, 2 pages.
(Continued)

*Primary Examiner* — David M Fenstermacher
*Assistant Examiner* — Bobby Rushing, Jr.
(74) *Attorney, Agent, or Firm* — Howard & Howard Attorneys PLLC

(57) ABSTRACT

A linear actuator assembly (30) having an inner sleeve (100) which moves in a first direction or in an opposite second direction relative to a fixed outer sleeve (90) between a fully extended position and a fully retracted position. The linear actuator assembly (30) includes a stop mechanism (99, 112) limiting the movement of the inner sleeve (100) relative to the outer sleeve (90) in the extended position, the stop mechanism (99, 112) having a first portion (99) associated with said outer sleeve (90) and a second portion (112) associated with said inner sleeve (100) with the first (99) and second (112) portions abutting each other when said inner sleeve (100) is in the extended position to define a hard stop.

15 Claims, 7 Drawing Sheets

(52) U.S. Cl.
CPC .............. *F16H 2025/2043* (2013.01); *F16H 2025/2046* (2013.01); *F16H 2025/2062* (2013.01); *F16H 2025/2075* (2013.01); *F16H 2025/2087* (2013.01)

(58) Field of Classification Search
USPC .......................................... 74/89.23, 424.71
See application file for complete search history.

(56) References Cited

U.S. PATENT DOCUMENTS

| | | | |
|---|---|---|---|
| 4,427,966 A * | 1/1984 | Gratzinger | H01C 10/14 338/162 |
| 5,059,158 A | 10/1991 | Bellio et al. | |
| 5,881,666 A | 3/1999 | Crews, Jr. | |
| 5,943,919 A | 8/1999 | Babinski | |
| 6,067,868 A | 3/2000 | Nakamura et al. | |
| 6,321,611 B1 * | 11/2001 | Szu | F16H 25/2015 192/141 |
| 6,550,351 B1 | 4/2003 | O'Reilly et al. | |
| 6,752,036 B2 | 6/2004 | Kropp et al. | |
| 6,918,314 B2 | 7/2005 | Wang | |
| 7,116,100 B1 | 10/2006 | Mock et al. | |
| 7,116,110 B1 | 10/2006 | Li | |
| 7,241,244 B2 | 7/2007 | Wang | |
| 7,681,469 B2 | 3/2010 | Ritter | |
| 7,845,248 B2 | 12/2010 | Yoshiyama et al. | |
| 8,001,861 B2 | 8/2011 | Fisher et al. | |
| 8,358,096 B2 * | 1/2013 | Bastholm | F16H 25/2015 192/138 |
| 9,091,334 B2 * | 7/2015 | Kollreider | A47B 9/04 |
| 2003/0000322 A1 | 1/2003 | Nagai et al. | |
| 2007/0144281 A1 * | 6/2007 | Inoue | F16H 25/2015 74/89.23 |
| 2008/0257087 A1 | 10/2008 | Chen | |
| 2008/0276537 A1 * | 11/2008 | Hanna | E05F 15/622 49/343 |
| 2009/0158868 A1 | 6/2009 | Farmer et al. | |
| 2009/0199668 A1 | 8/2009 | Batosky et al. | |
| 2009/0260463 A1 | 10/2009 | Fukano et al. | |
| 2010/0137802 A1 | 6/2010 | Yodfat et al. | |
| 2010/0282008 A1 | 11/2010 | Knudsen et al. | |
| 2015/0240547 A1 * | 8/2015 | Fischer | F16H 25/20 74/89.4 |

FOREIGN PATENT DOCUMENTS

| | | | |
|---|---|---|---|
| EP | 1 767 439 A2 | 3/2007 | |
| EP | 2196702 A2 * | 6/2010 | ............ E05F 15/603 |

OTHER PUBLICATIONS

International Search Report of WO2013076557A1 dated Feb. 13, 2013, 3 pages.

International Search Report of WO2013076561A1 dated Feb. 13, 2013, 3 pages.

* cited by examiner

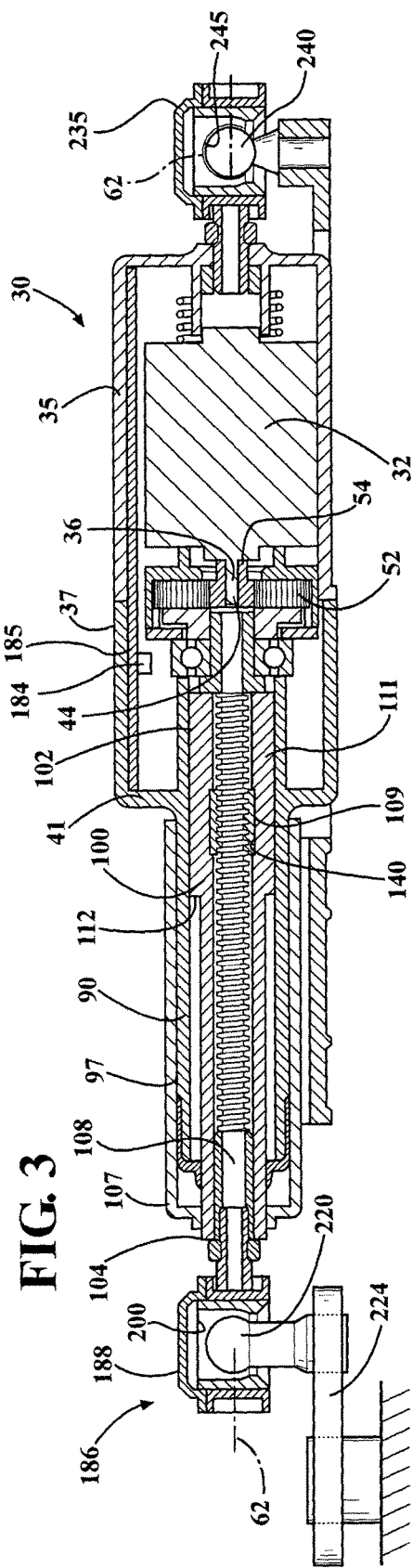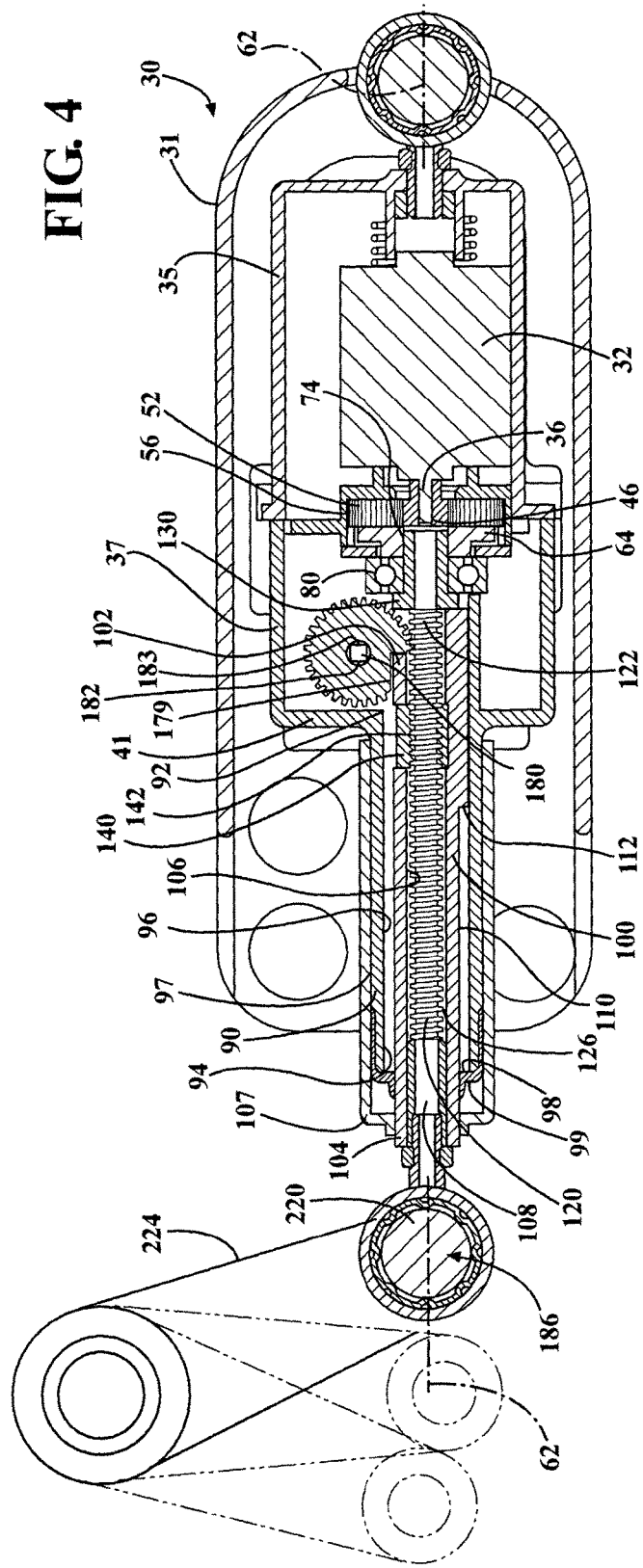

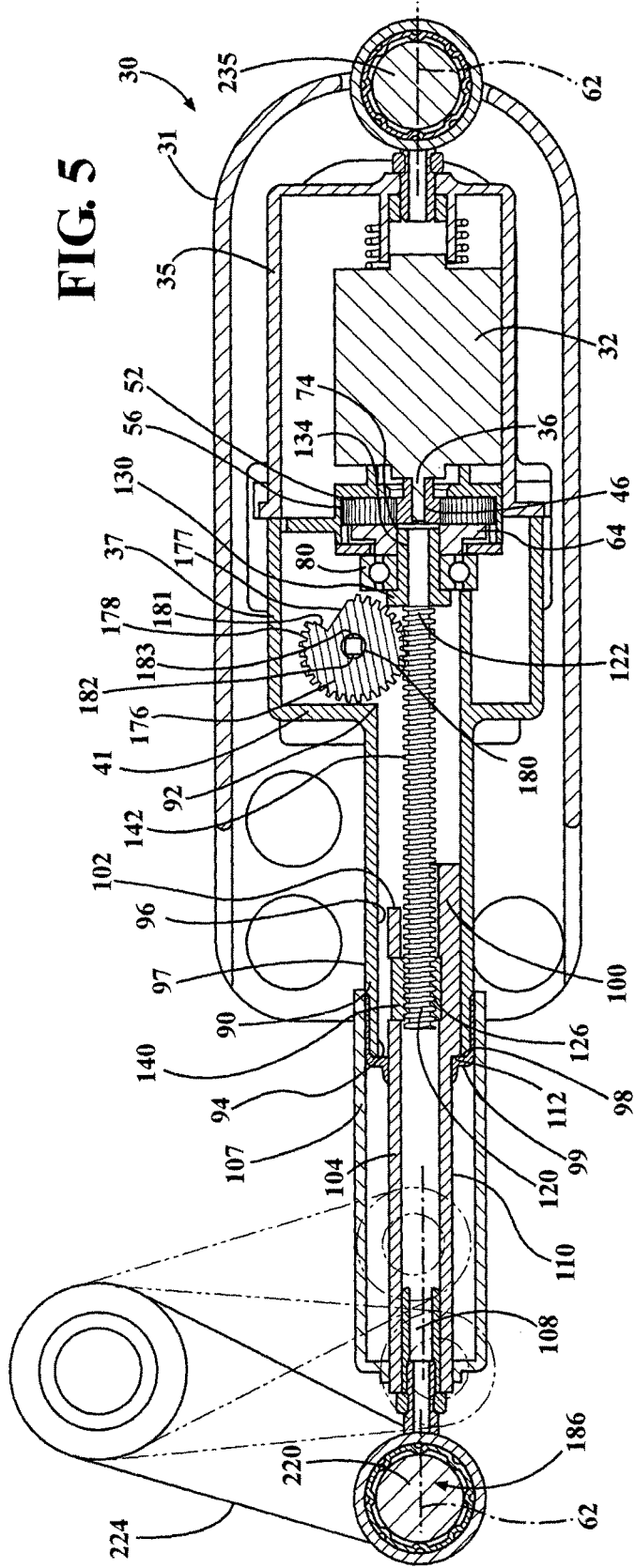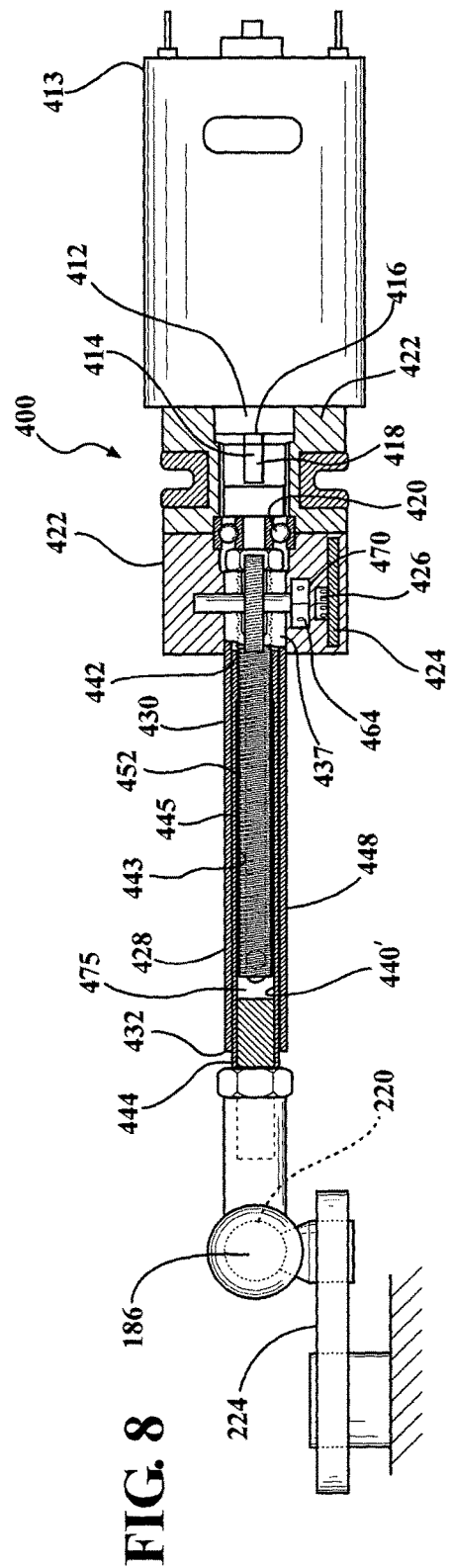

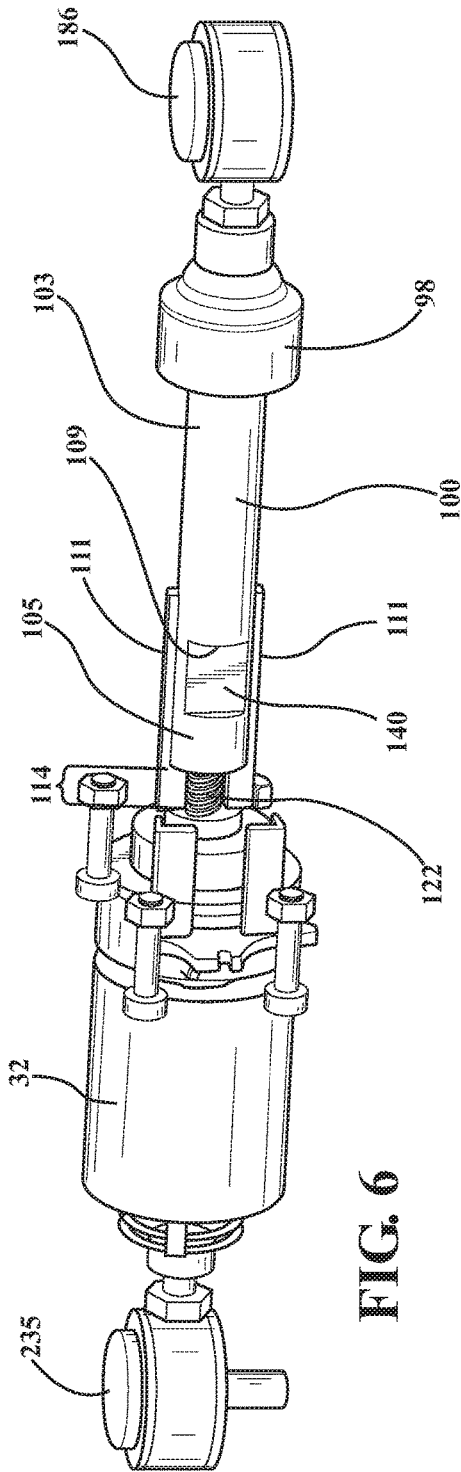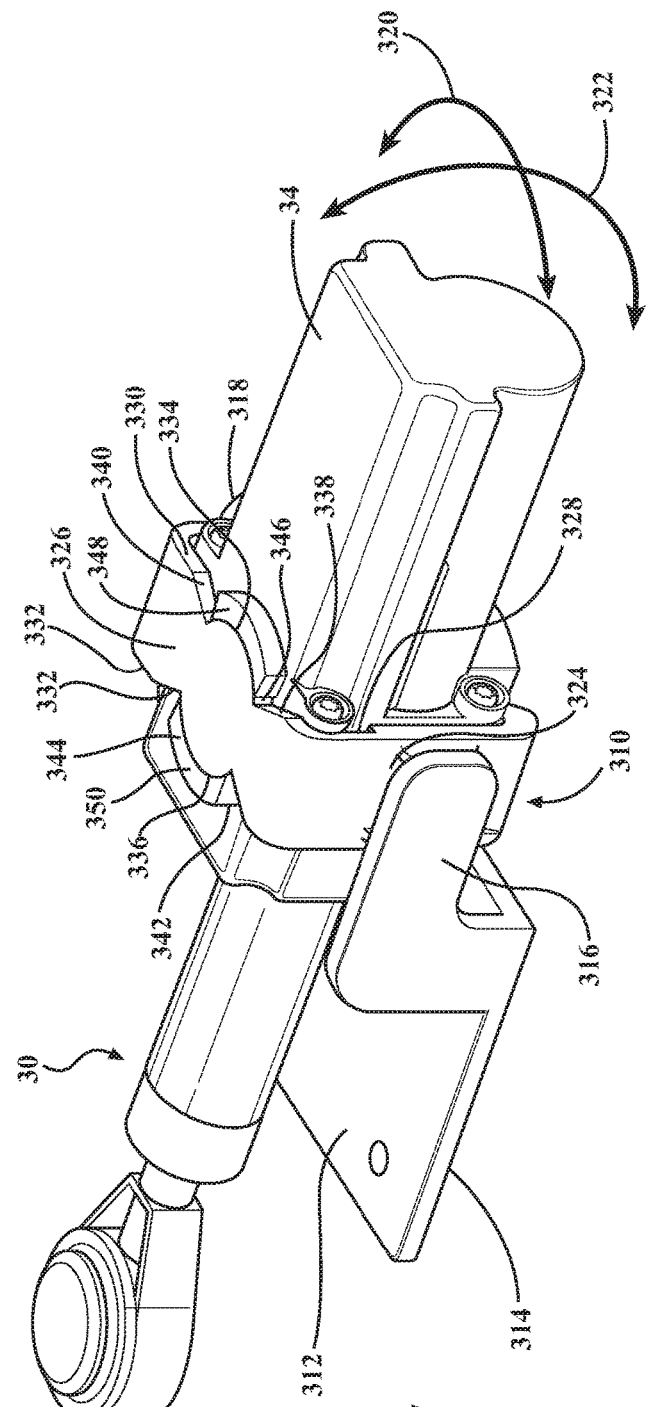

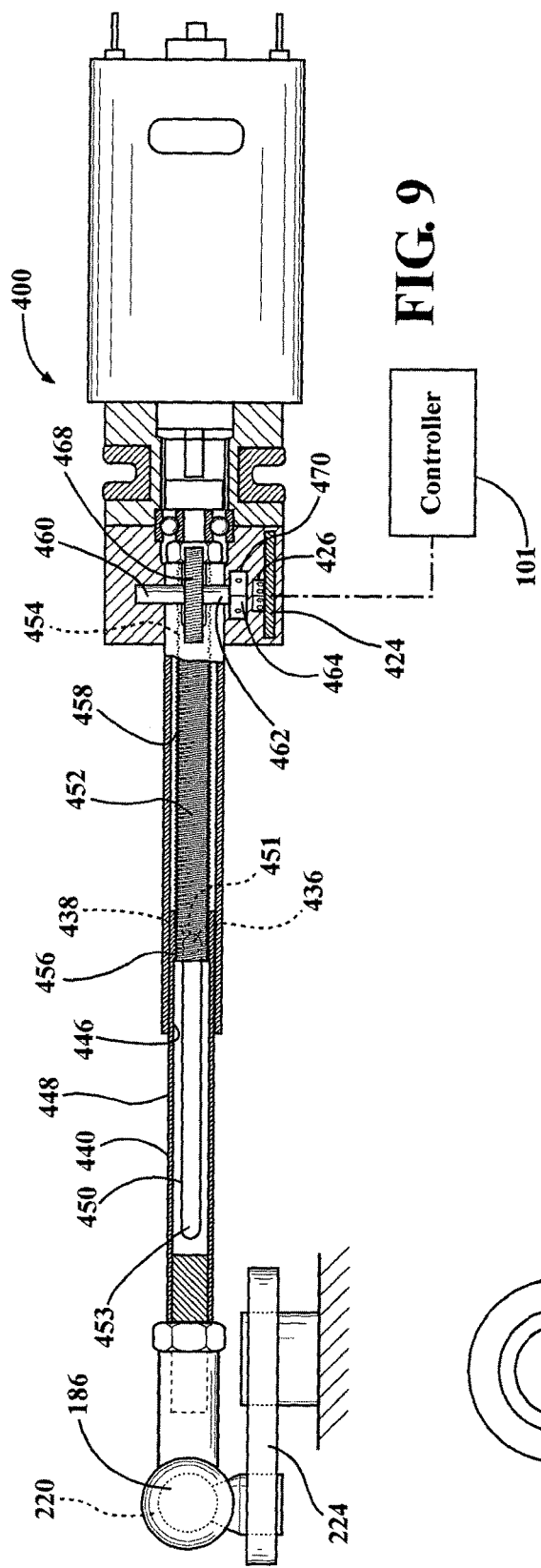
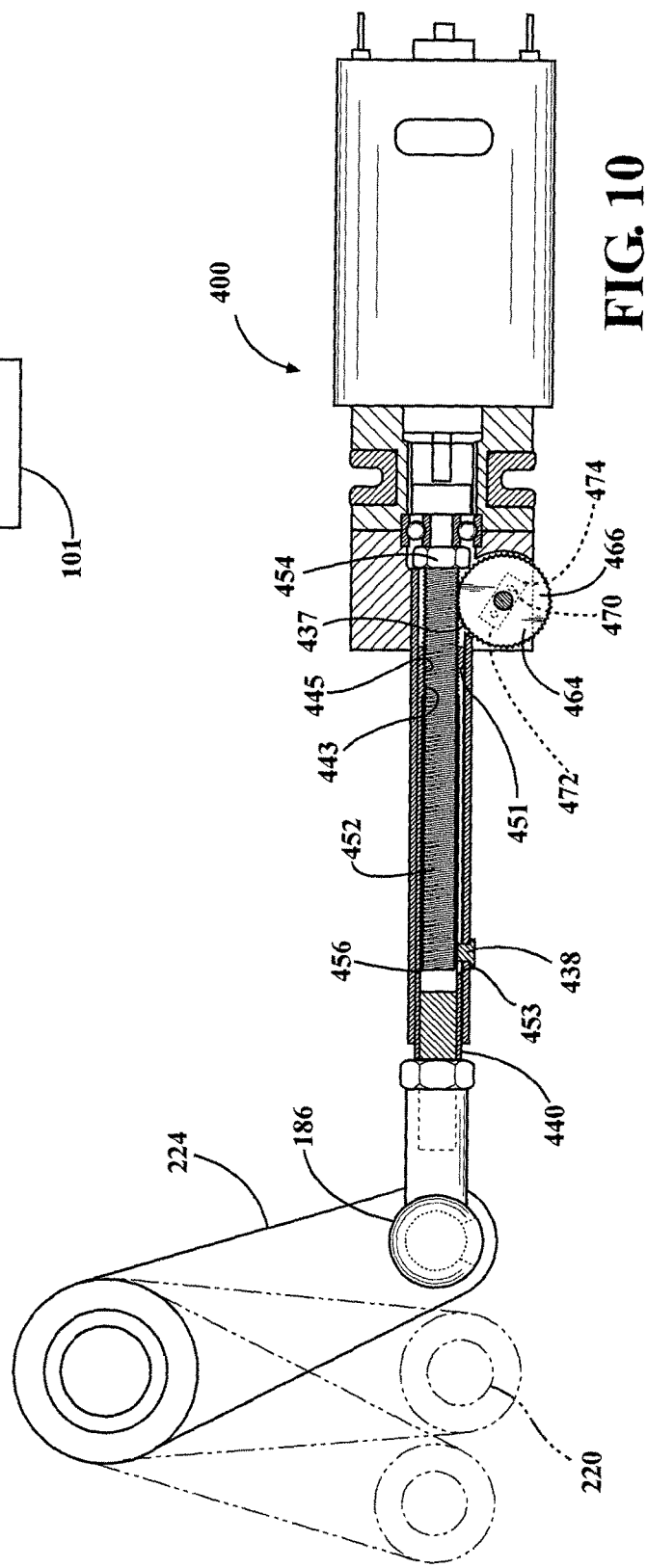

LINEAR ACTUATOR ASSEMBLY

CROSS REFERENCE TO RELATED APPLICATION

This application is the National Stage of International Patent Application No. PCT/IB2012/002431, filed on Nov. 21, 2012, which claims the benefit of U.S. Provisional Patent Application Ser. No. 61/562,149 filed Nov. 21, 2011, the contents of which are incorporated herein by reference.

BACKGROUND OF THE INVENTION

1. Field of the Invention

The present invention generally relates to a linear actuator assembly, and more specifically to a linear actuator assembly for use in shift by wire transmission systems.

2. Description of the Related Art

A technology that is becoming increasingly common in gearboxes in vehicles is so-called "shift by wire" technology. In other words a system where there is no mechanical connection between the gear lever and the gearbox. Instead, such systems have an electronic connection between a gear selector, arranged in association with the gear lever, and the gearbox. The position of the gear lever in the gear selector is read off by a sensor arrangement that sends information about the position of the gear lever to the gearbox, whereupon a required gear position is assumed.

Linear electromechanical actuators, also known as linear actuator assemblies, are useful in vehicle transmissions to facilitate gear selection and provide shift-by-wire functionality. These linear actuator assemblies offers a number of advantages over electromechanical systems based on electric motors and gearboxes in that their outer appearance is similar to a mechanical cable end and thus allows simple attachment and interface to existing Bowden cable operated transmissions. The present invention provides simple, robust linear actuator assemblies having electronic and mechanical control.

SUMMARY OF THE INVENTION AND ADVANTAGES

The present invention provides a linear actuator assembly comprising a housing and a motor at least partially supported by the housing. The linear actuator assembly also comprises an outer sleeve coupled to the housing and defining a working chamber with the outer sleeve defining a longitudinal axis and an inner sleeve disposed within the working chamber and movable between a retracted position and an extended position along the longitudinal axis relative to the outer sleeve. The inner sleeve has a first end and an opposing second end and a series of threads disposed along at least a portion of the sleeve. A screw is coupled to the motor and extends outwardly from the motor along the longitudinal axis with the screw having a threaded exterior surface engaging the threads of the inner sleeve, wherein the rotation of the motor rotates the screw through the threads of the inner sleeve and facilitates the movement of the inner sleeve between the retracted and extended positions along the longitudinal axis. The linear actuator assembly also comprises a stop mechanism limiting the movement of the inner sleeve relative to the outer sleeve in the extended position, the stop mechanism having a first portion associated with the outer sleeve and a second portion associated with the inner sleeve with the first and second portions abutting each other when the inner sleeve is in the extended position to define a hard stop.

The linear actuator assembly may be utilized in transmission shift by wire assemblies of vehicles.

BRIEF DESCRIPTION OF THE DRAWINGS

FIG. 3 is a partially cross-sectioned side view the linear actuator assembly of FIG. 1.

FIG. 4 is a partially cross-sectioned top view of the linear actuator assembly connected to a gearshift lever in a fully retracted position.

FIG. 5 is a partially cross-sectioned top view of the linear actuator assembly connected to a gearshift lever in a fully extended position.

FIG. 6 is a partially cross-sectioned side view of a portion of the linear actuator assembly of FIG. 1.

FIG. 7 is a perspective view of the linear actuator assembly mounted within an alternative bracket assembly in accordance with another embodiment of the present invention.

FIG. 8 is a partially cross-sectioned side of a linear actuator assembly connected to a gearshift lever in a fully retracted position in accordance with yet another embodiment of the present invention.

FIG. 9 is a partially cross-sectioned side of a linear actuator assembly connected to a gearshift lever in a fully extended position in accordance with the embodiment of FIG. 8.

FIG. 10 is a partially cross-sectioned side of a linear actuator assembly connected to a gearshift lever illustrating the positioning of a gearshift lever coupled to the linear actuator assembly in three positions in accordance with the embodiment of FIG. 8.

DETAILED DESCRIPTION OF THE INVENTION

Figure 1:
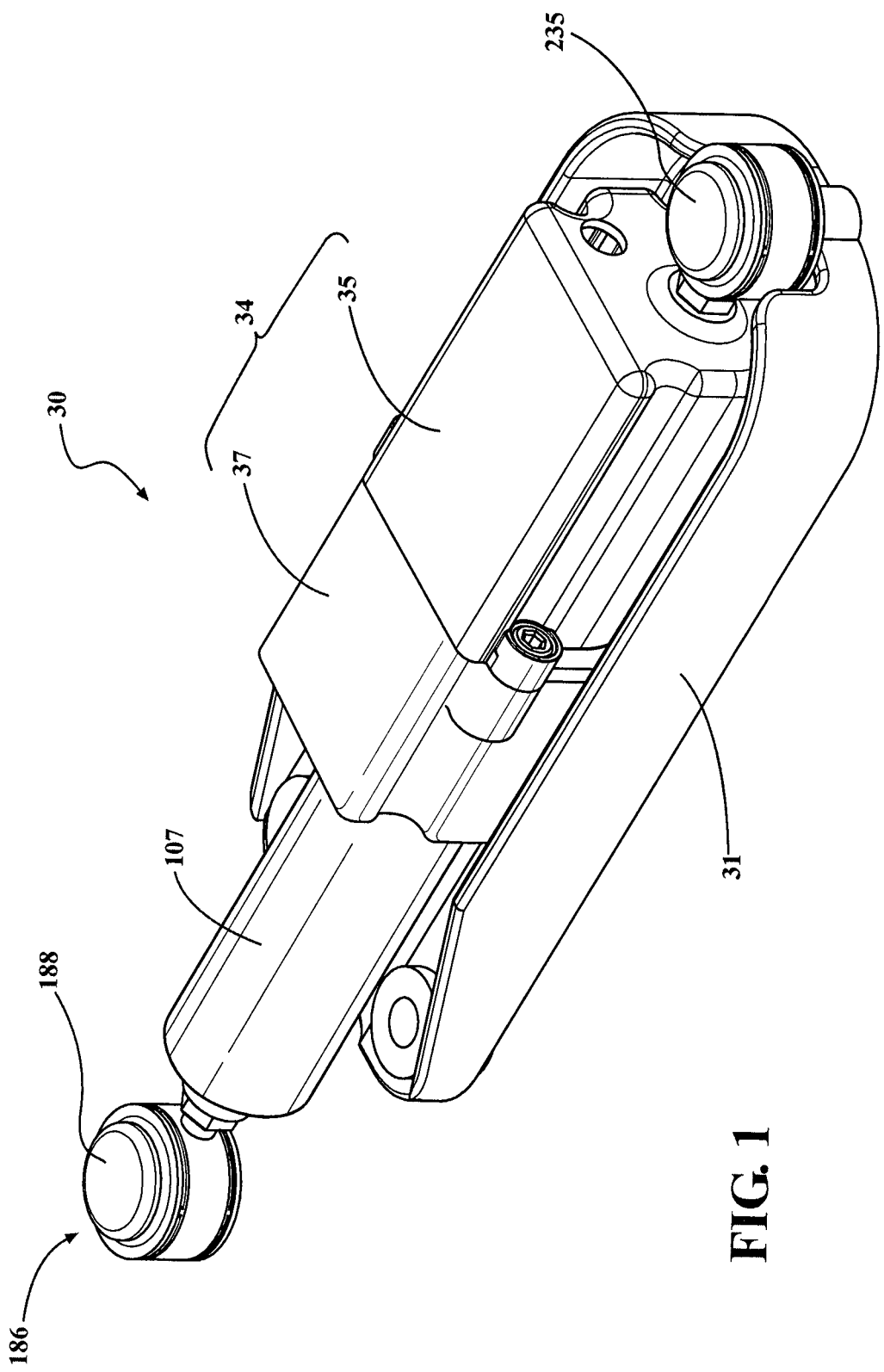
FIG. 1 is a perspective view of a linear actuator assembly in accordance with one embodiment of the present invention.

Referring to the FIGS. 1-6, wherein like numerals indicate like or corresponding parts throughout several views, a linear actuator assembly 30 in accordance with one exemplary embodiment is generally shown. The linear actuator assembly 30 may be utilized in transmission shift by wire assemblies of vehicles.

The linear actuator assembly 30 includes a motor 32 disposed in and at least partially supported by a housing 34. The housing 34, in certain embodiments, includes a first portion 35 mated or otherwise fixedly coupled to a second portion 37. The motor 32 includes an output shaft 36 extending through an aperture 38 in a ring gear 56 that is fixedly coupled to the motor 32. The assembly 30 may be seated onto, or fixedly attached, to a bracket assembly 31.

The output shaft 36 includes a first end extending into the motor 32 and second end 44 extending outwardly away from the motor 32. The second end 44 preferably includes a splined outer surface 46. The motor 32 and output shaft 36 are shown schematically in FIG. 3-5.

Figure 2A:
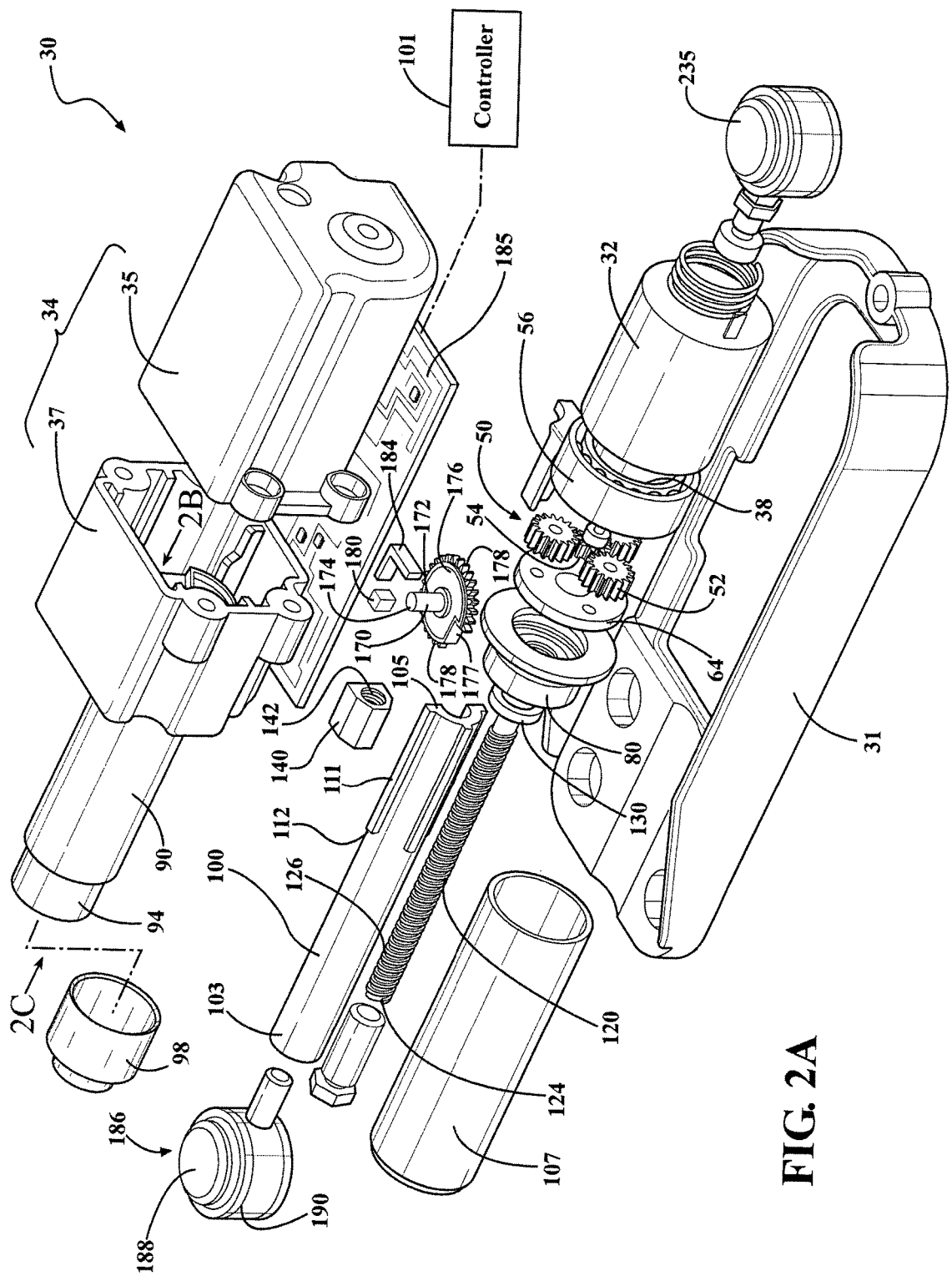
FIG. 2A is an exploded perspective view of the linear actuator assembly of FIG. 1.
Figure 2C:
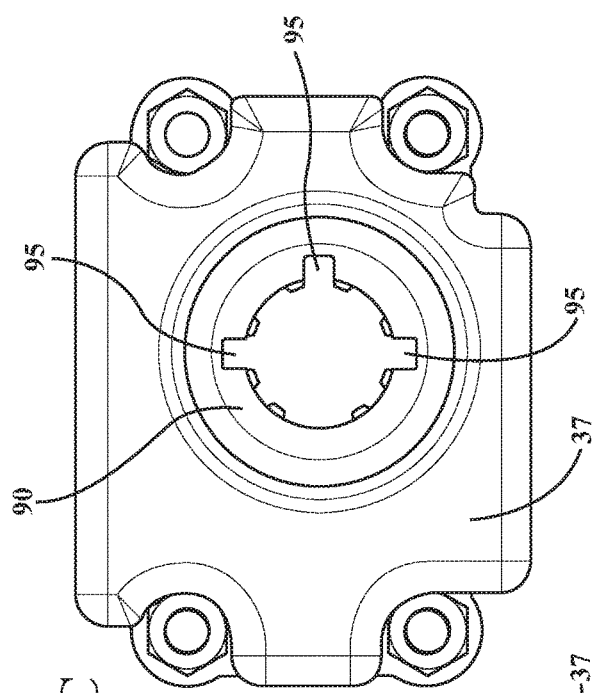
FIG. 2C is a front perspective view of FIG. 2B.

The assembly 30 also includes a gear assembly 50 including a plurality of planetary gears 52 located radially around and engaged with a central, or sun gear 54. The planetary gears 52 are located radially within the ring gear 56 that is fixed within the space between the housing 34 and the motor 32. The sun gear 54 preferably includes an internal aperture that mates to the outer surface 46 of the output shaft 36 when the output shaft 36 is coupled to the sun gear 54. in certain embodiments, the output shaft 36 is press fit within the aperture of the sun gear 54. When powered, the output shaft 34 of the motor 32 will rotate the sun gear 54, which in turn rotates the plurality of planetary gears 52 in response. As the planetary gears rotate 52, they travel in a circular manner along the geared inner surface of the fixed ring gear 56 and about a center axis 62. As best shown in FIG. 2A, each of the planetary gears 52 is rotatably mounted to a planet carrier 64 using a pin or other fastening device. The planet carrier 64 includes an aperture 74.

Figure 2D:
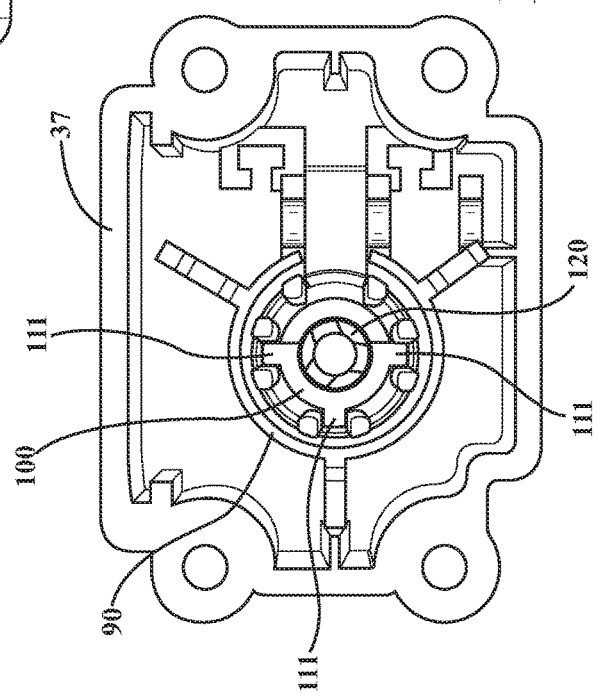
FIG. 2D is another rear perspective view of the portion of the housing and outer sleeve with an inner sleeve and screw disposed within the outer sleeve of the linear actuator assembly of FIG. 2A.
Figure 2B:
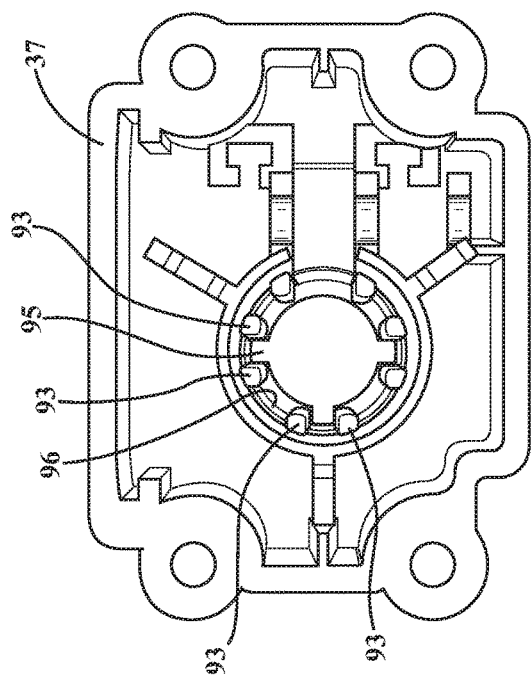
FIG. 2B is a rear perspective view a portion of a housing and an outer sleeve of the linear actuator assembly of FIG. 2A.

The linear actuator assembly 30 has an outer sleeve 90 defining a first end 92 and a second end 94. The outer sleeve 90 also defines a longitudinal axis and an interior surface 96 defining a working chamber and an exterior surface 97. As best shown in FIG. 2B, the interior surface 96 also includes a series of inwardly projecting flanges 93, wherein a respective pair of the series of flanges 93 defines a respective guide slot 95. The longitudinal axis may be parallel to or equivalent to the center axis 62. The working chamber extends from the first end 92 to the second end 94. A cap or seal-like structure 98 having a shoulder 99 is mounted to the second end 94 of the outer sleeve 90. In the illustrated embodiment, the outer sleeve 90 is a portion of the housing 34 (i.e., is integrally formed with the housing 34). In particular, the outer sleeve 90 abuts the second portion 37 of the housing 34 to define a stepped portion 41. Alternatively, the sleeve 90 may be separately affixed or otherwise coupled to and extend from the housing 34.

The linear actuator assembly 30 also has an inner sleeve 100. As best shown in FIGS. 2D and 3-5, the inner sleeve 100 is disposed within the working chamber of the outer sleeve 90. The inner sleeve 100 has a first end 102 and a second end 104. The inner sleeve 100 also defines the longitudinal axis and an interior surface 106 defining an inner region 108. Referring specifically to FIGS. 2C, 2D and 4-5, the inner sleeve 100 further includes an exterior surface 110 having a plurality of tabs 111, with each of the plurality of tabs 111 disposed within a respective one of the plurality of guide slots 95 of the outer sleeve 90, as best shown in FIG. 2D. Also, each of the tabs 111 define a respective shoulder 112 near the first end 102. In addition, the inner sleeve 100 is cylindrical near the second end 104, but becomes semi-cylindrical nearer to the first end 102, and therefore defines a cylindrical region 103 and a semi-cylindrical region 105. A slot 109 is formed in the interior surface 106 of the semi-cylindrical region 105 of the inner sleeve 100. Further, the tabs 111 extend beyond the semi-cylindrical region 105 at the first end 102 of the inner sleeve 100 towards the motor 32. As best shown in FIG. 6, the portions of the tabs 111 that extend beyond the semi-cylindrical region 105 of the first end 102 define a gap 114 in the inner sleeve 100 wherein a portion of the screw 102 remains exposed.

A protective shield 107 is mounted to or otherwise coupled to the second end 104 of the inner sleeve 100 and extends from the second end 104 over the exterior surface 97 of the outer sleeve 90. The shield 107 can be integrally formed with the inner sleeve 100 or, as shown, may be formed as a separate piece and coupled to the inner sleeve 100 at the second end 104. The shield 107 preferably surrounds the inner sleeve 100 such that the inner sleeve 100 is not exposed during movement and such that the shield 107 overlies at least a portion of the outer sleeve 90 during movement between a fully extended position, as shown in FIG. 5, and a fully retracted position, as shown in FIG. 4. An o-ring (not shown) mounted on a groove within the inner surface of the shield 107 and abutting the outer sleeve 90 may be utilized to seal the shield 107 to the outer sleeve 90.

The linear actuator assembly 30 further includes a screw 120. The screw 120 is disposed in the inner region 108 of the inner sleeve 100. The screw 120 has a first end 122 and a second end 124. The screw 120 also has a threaded exterior surface 126 along a portion of its length. An adaptor 130 coupled within the housing 34 is fixedly coupled to the first end 122 of the screw 120. The outer surface 134 of the adaptor 130 is preferably press fit or otherwise contained within the aperture 74 of the planet carrier 64. As such, the screw 120 is coupled to the motor 32 through the gear assembly 50 (i.e., the gear assembly 50 is disposed between the motor 32 and the screw 120) and extends outwardly from the motor 32 along the longitudinal axis. The assembly 30 also includes a bearing 80 coupled within the housing 34 with the adaptor 130 being supported by the bearing 80 to facilitate rotation of the adaptor 130, fix the screw 120 longitudinally, and absorb axial forces to protect the motor 32.

The inner sleeve 100 includes a nut 140 having a threaded interior surface 142 defining a series of threads which are threadingly engaged with the threaded exterior surface 126 of the screw 120 and is affixed within the slot 109 of the interior surface 106 of the inner sleeve 100. Thus, the nut 140 remains in a fixed location relative to the inner sleeve 100 as the screw 120 is rotated such that the nut 140 and the inner sleeve 100 move as a unit. In alternative embodiments, a nut 140 is not utilized, and thus the threaded exterior surface 126 of the screw 120 is threadingly engaged with the threaded interior surface 142 of the inner sleeve 140 along the portion of the length illustrated as including the nut in FIGS. 1-7.

When powered, the output shaft 36 of the motor 32 will rotate the sun gear 54, which in turn rotates the plurality of planetary gears 52 and planet carrier 64 around the center axis 62. The rotation of the planet carrier 64 in turn rotates the adaptor 130, which in turn rotates the screw 120, which will rotate within the threaded interior surface 142 of the nut 140. The nut 140 and inner sleeve 100 will move axially as a unit along the length of the screw 120 and outer sleeve 90, with the respective plurality of tabs 111 moving axially within each of the respective plurality of guide slots 95 of the outer sleeve 90 and along the longitudinal axis in response to the rotation of the screw 120. Notably, the coupling of the plurality of tabs 111 within the respective plurality of guide slots 95 prevents the inner sleeve 100 from rotating as a unit with the screw 120. The screw 120 remains longitudinally fixed relative to the outer sleeve 90 and the longitudinal axis while rotating. In addition, the outer sleeve 90 remains fixed to the housing 34 and fixed relative to the housing 34 during movement of the inner sleeve 100.

The inner sleeve 100 can be linearly displaced axially along the longitudinal axis relative to the screw 120 and outer sleeve 90 in a first longitudinal direction when the motor 32 is rotating in a first direction (i.e., the first rotational direction) until such time as the shoulder 112 of the tab 111 on the inner sleeve 100 is brought into contact with the shoulder 99 of the cap 98 on the outer sleeve 90. Stated differently, the linear actuator assembly includes a stop mechanism that limits the movement of the inner sleeve 100 relative to the outer sleeve 90 at the fully extended position, as shown in FIG. 5, when a first portion associated with the outer sleeve 90 and a second portion associated with the inner sleeve 100 abut each other to define a hard stop. As the inner sleeve 100 is displaced, the shield 107 is also linearly displaced axially in a direction away from the stepped portion 41 of the housing 34. Rotating the output shaft 36 and the motor 32 in the opposite direction (i.e., the second rotational direction) will allow the inner sleeve 100 to move axially in the opposite linear direction along the longitudinal axis (i.e. a second longitudinal direction) toward the stepped portion 41 of the housing 34. This movement will continue until the tabs 111 contact the adaptor 30, or wherein the protective shield 107 contacts the stepped portion 41 of the housing 34, or both, as described in greater detail below in the fully retracted position, as shown in FIG. 4. Thus, the length of displacement of the inner sleeve 100 relative to the outer sleeve 90 and screw 120 is limited.

The linear actuator assembly 30 also includes a shaft 170 with the shaft 170 having an axis. The shaft 170 also has an exterior surface 172 and a first end 174. The linear actuator assembly 30 also has a gear 176 supported within the housing 34 with the gear 176 having an exterior surface 178. The shaft 170 is disposed in and abuts the gear 176. Alternatively, the shaft 170 and gear 176 may be integrally formed as a single piece or mounted together for concurrent rotation. The exterior surface 178 of the gear 176 has teeth. The gear 176 also has an emitter, shown in FIGS. 1-6 as a magnet 180, which is attached to and abuts the first or distal end 174 of the shaft 170. The magnet 180 is located in close proximity to a sensor, shown in FIG. 2 as a Hall Effect sensor 184. The magnet 180 has a North Pole 182 and a South Pole 183 that emits a magnetic field. In alternative arrangements, the magnet 180 may be attached to any other portion of the gear 176 or shaft 170. Further, it can be appreciated that other sensor arrangements could be implemented. A printed circuit board 185 electrically coupled to the Hall Effect sensor 184 is disposed within the housing 34. The printed circuit board 185 is electrically coupled to a controller 101.

The teeth of the gear 176 are disposed in are threadingly engaged with the threaded exterior surface 126 of the screw 120 such that the gear 176 rotates the shaft 170 and the magnet 180 during the movement of the inner sleeve 100. As the magnet 180 rotates, the circular movement of the North Pole 182 and the South Pole 183 create a change in the magnetic field. The Hall Effect sensor 184 that is positioned adjacent the magnet 180 detects the change in the magnetic field. The different magnetic field measurements detected by the Hall Effect sensor 184 are electronically transmitted to the printed circuit board 185 and the controller 101 to determine the axial position of the inner sleeve 100 relative to the outer sleeve 90 along the longitudinal axis. The gear 176 should have a gear ratio with the screw 120 that would rotate the magnet 180 approximately 300 degrees for the entire linear displacement of the inner sleeve 100. The large amount of rotation will provide good variation in the magnetic field between the different positions of the inner sleeve 100 that allows for an accurate determination of the linear positioning of the inner sleeve 100 relative to the outer sleeve 90 in the assembly 30.

As mentioned above, the gear 176 also includes a notch, or cut-out region 177, that removes approximately 60-120 degrees of the teeth of the gear 176 and therefore defines a first end 179 and a second end 181 of the teeth of the gear 176. In the fully retracted position, as shown in FIG. 4, the first end 102 of the inner sleeve 100 is positioned within the notch 177 of the gear 176 and the second end 181 of the gear 176 is in contact with the threaded portion of the exterior surface 126 of the screw 120. The gap 114 formed in the inner sleeve 100 provides the necessary clearance for the second end 181 of the gear 176 to remain in contact with the screw 120. In this position, the inner sleeve 100 is prevented from retracting further towards the motor 32 due the contact of the tabs 111 with the adaptor 30 or wherein the protective shield 107 contracts the stepped portion 41 of the housing 34. In the fully extended position, as shown in FIG. 5, the gear 176 has rotated clockwise approximately 250-300 degrees relative to the positioning of the gear 176 when in the fully retracted position. Stated differently, the complete rotation of the gear 175 from the fully retracted position, as shown in FIG. 4, to the fully extended position, as shown in FIG. 5, is approximately 250-300 degrees.

In certain embodiments, as noted above, the linear actuator assembly 30 is utilized in transmission shift by wire assemblies of vehicles. In these embodiments, as shown best in FIGS. 3-5, a first terminal 186, having a terminal end fitting 188, is coupled to a gear shift lever 224. The terminal end fitting 188 extends into the inner region 108 of the inner sleeve 100 and is connected or otherwise mounted to the inner sleeve 100.

The first terminal 186 includes an interior region 200 that is designed to be mounted about a pin 220 of the gear shifter 224. The configuration of the interior region 200 of the first terminal 186 and the gear shifter 224 can be of any suitable design. Once mounted, the pin 220 may articulate within the interior region 200 to shift the transmission of a vehicle as desired. The first terminal 186 moves as a unit with the inner sleeve 100 from a first position, corresponding to the fully retracted position of the linear actuator assembly 30, to a second position corresponding to the fully extended position of the linear actuator assembly 30. The gear shifter 224 is displaced as the inner sleeve 100 of the linear actuator assembly 30 moves from the fully retracted position to the fully extended position, as best shown in FIGS. 4 and 5.

Also shown in FIGS. 1-6 is a second terminal 235 which is coupled to first portion 35 of the housing 34 near the motor 32. The second terminal 235 is structurally similar to the first terminal 186, and may accommodate a pin 240 within an interior region 245 similar to the first terminal 186. However, as opposed to the first terminal 186, the second damper assembly 235 is not displaced axially relative to the housing 34 and motor 32 as the linear actuator assembly 30 is moved from a fully retracted position to a fully extended position. Stated differently, the second terminal 235, as one of ordinary skill readily recognizes, is a fixed terminal in a transmission shift by wire assembly, whereas the first terminal 186 is considered the displaceable terminal. However, during gear shifting, the linear actuator assembly 30 may articulate on the pin 240 to facilitate the up or down displacement of the gear shifter 224 during the gear shifter's pivotal movement.

Referring to FIG. 7, an alternative mounting bracket assembly 310 to the bracket assembly 31 for attachment to the linear actuator assembly 30 is generally shown. The mounting bracket assembly 310 includes a mount 312. The mount 312 includes a plate 314 having a first arm 316 and a second arm 318. In the embodiment shown, the first arm 316 and second arm 318 are generally L-shaped and have an interior surface. The interior surfaces are perpendicular to the plate 314 and parallel to each other.

The mounting bracket assembly 310 also includes an actuator bracket 326 rotationally mounted to the first arm 316 and the second arm 318 about a first pivot axis with the first pivot axis being transverse to the longitudinal axis. The housing 34 is supported by the actuator bracket 326 to permit the housing 34 to rotate about the first pivot axis, relative to the plate 314, as shown by arrow 322, to assist with installation of the linear actuator assembly 30 on the first terminal 186 and on the gear shifter 224.

The actuator bracket 326 has a bearing 346 defining a second pivot axis transverse to the longitudinal axis and the first pivot axis. The housing 34 has a journal 348, 350 rotatably mounted about the bearing 346 to permit the housing 34 to rotate about the second pivot axis. Rotation about the second pivot axis will typically occur during operation of the linear actuator assembly 30.

The bearing 346 of the actuator bracket 326 includes a first end 330 and a second end 332. The first end 330 includes a curved surface 334 and the second end 332 includes another curved surface 336. The first end 330 and second end 332 also include angled surfaces 338, 340, 342, 344.

The journal 348, 350 of the housing 34 is further defined as two curved ribs 348, 350. The linear actuator assembly 30 can rotate about the second pivot axis of the bearing 346 by the curved ribs 348, 350 along the curved surfaces 334, 336, as shown by arrow 320. The rotation about the second pivot axis is limited when the curved ribs 348, 350 of the journal 348, 350 abut the angled surfaces 338, 340, 342, 344 of the bearing 346. As mentioned above, rotation of the linear actuator assembly 30 is necessary to accommodate the arcuate motion of the gear shifter 224 (see FIG. 4).

Referring to the FIGS. 8-10, wherein like numerals indicate like or corresponding parts throughout several views, a linear actuator assembly 400 in accordance with another exemplary embodiment is shown. Similar to the linear actuator assembly 30, the linear actuator assembly 400 may be utilized in transmission shift by wire assemblies of vehicles.

The linear actuator assembly 400 includes a motor 412 coupled within a housing 413. The motor 412 includes an output shaft 414.

The output shaft 414 includes a first end 416 and second end 418. The motor 412 is disposed around and abuts the first end 416 of the output shaft 414. The second end 418 is disposed in and abuts a bearing 420. The bearing 420 protects the motor 412 from axial forces. The motor also abuts a case 422. The case 422 is disposed around the bearing 420 and includes a printed circuit board 424 and Hall Effect sensor 426. The printed circuit board 424 is electrically coupled to a controller 101, which typically includes a central processing unit.

The linear actuator assembly 400 has an outer sleeve 428 defining a first end 430 and a second end 432. The first end 430 is disposed in the case 422 and abuts the bearing 420. The outer sleeve 428 also has an axis and an interior surface 434 defining a working chamber. The working chamber extends from the first end 430 to the second end 432. The outer sleeve 428 further includes an aperture 436 and a pin 438 with the pin 438 disposed in the aperture 436 and positioned near the second end 432. The outer sleeve 428 further defines a second aperture 437, or removed section, located at the second end 432.

The linear actuator assembly 400 also has an inner sleeve 440. The inner sleeve 440 is disposed within the working chamber of the outer sleeve 428. The inner sleeve 440 has a first end 442 and a second end 444. The inner sleeve 440 also has an axis and an interior surface 446 defining a second chamber. The second chamber extends from the first end 442 to the second end 444. The interior surface 446 of the second chamber includes inwardly projecting collar 443 having a threaded surface 445 defining a series of threads. The collar 443 projects inwardly into the second chamber and is preferably near the first end 442. The collar 443 may be integrally formed with the inner sleeve 440, as shown, or separately coupled to the inner sleeve 440. Referring specifically to FIG. 8, the inner sleeve 440 further includes an exterior surface 448 and a slot 450 that extends along a majority of the length of the inner sleeve 440.

The linear actuator assembly 400 further includes a screw 452. The screw 452 is disposed in the second chamber of the inner sleeve 440. The screw 452 has a first end 454 and a second end 456. The screw 452 also has an exterior surface 458. The exterior surface 458 of the screw 452 is threaded. The first end 454 of the screw 452 abuts the bearing 420.

The inner sleeve 440 is disposed in the working chamber of the outer sleeve 428. The screw 452 is disposed in the second chamber of the inner sleeve 440. The threads on the threaded exterior surface 458 of the screw 452 are disposed in and abut the threaded portion 445 of the collar 443 of the inner sleeve 440. Stated differently, the threads of the exterior surface 458 of the screw 452 are threadingly engaged with the threads of threaded surface 445 of the inner sleeve 440. The screw 452 is attached to and abuts the bearing 420. The bearing 420 is disposed around and attached to the second end 418 of the output shaft 414.

When powered, the output shaft 414 of the motor 412 will rotate the bearing 420 and screw 452. The threads of the threaded exterior surface 458 of the screw 452 will rotate within the threaded surface 445 of the inwardly projecting collar 443 of the inner sleeve 440. The inner sleeve 440 will move axially along the screw 452. Referring specifically to FIG. 7, in order to prevent the inner sleeve 440 from rotating and extending past the screw 452, the slot 450 of the inner sleeve 440 is aligned with the aperture 436 of the outer sleeve 428. The pin 438 is inserted into the aperture 436 and the slot 450. The pin 438 will remain stationary as the slot 450 of the inner sleeve 440 moves. The inner sleeve 440 can only be displaced the length of the slot 450 as the pin 438 will stop the inner sleeve 440 at each end 451, 453 of the slot 450. Stated differently, the pin 438 and slot 450 define a stop mechanism that limits the range of movement of the inner sleeve 440 axially along a longitudinal axis relative to the outer sleeve 428 between a fully extended position, as shown in FIG. 8, and a fully retracted position as shown in FIGS. 7 and 9.

The linear actuator assembly 400 includes a shaft 460 with the shaft 460 having an axis. The shaft 460 also has an exterior surface 462 and a bottom end 464. The linear actuator assembly 400 also has a gear 466 with the gear 466 having an exterior surface 468. The shaft 460 is disposed in and abuts the gear 466. The gear 466 is disposed within and at least partially supported by the housing 413 and engages the screw 452 through the second aperture 437 in the outer sleeve 428. The exterior surface 468 of the gear 466 has teeth. The shaft 460 also has a magnet 470 which is attached to and abuts the bottom end 464 of the shaft 460. The magnet 470 has a north pole 472 and a south pole 474.

The teeth of the gear 466 are disposed in and threadingly engaged with the threaded exterior surface 458 of the screw 452. The gear 466 will rotate when the screw 452 rotates to change the linear position of the inner sleeve 440. The gear 466 rotates the shaft 460 and the magnet 470. As discussed above, as the magnet 470 rotates, the circular movement of the North Pole 472 and the South Pole 474 create a change in the magnetic field. The Hall Effect sensor 426 positioned below the magnet 470 will detect the change in the magnetic field. The different magnetic field measurements detected by the Hall Effect sensor 426 are electronically transmitted to the printed circuit board (not shown), which includes a central processing unit that can determine the linear position of the inner sleeve 440 relative to the outer sleeve 428. Alternatively, the Hall Effect sensor 426 may itself have the capability for determining the linear position of the inner sleeve 440 relative to the outer sleeve 428 in the assembly 400. The gear 466 preferably has a gear ratio with the screw 452 that would rotate the magnet 470 approximately 300 degrees for the entire linear displacement of the inner sleeve 440. The large amount of rotation will provide good variation in the magnetic field between the different positions of the inner sleeve 440.

Similar to the linear actuator assembly 30, a first terminal 186 may be mounted to the linear actuator assembly 400. More specifically, a terminal end fitting 188 of the first terminal 186 is disposed within an inner region 475 of the inner sleeve 440.

Similar to the first embodiment shown in FIGS. 1-6, the first terminal 186 may be designed to be mounted about a pin 220 of a gear shifter lever 224 and operate in a similar manner.

The present inventions have been described herein in an illustrative manner, and it is to be understood that the terminology which has been used is intended to be in the nature of words of description rather than of limitation. Many modifications and variations of the present inventions are possible in light of the above teachings. The inventions may be practiced otherwise than as specifically described within the scope of the appended claims.

What is claimed is:

1. A linear actuator assembly comprising:
a housing;
a motor at least partially supported by said housing;
an outer sleeve coupled to said housing and defining a working chamber with said outer sleeve defining a longitudinal axis;
an inner sleeve disposed within said working chamber and moveable between a retracted position and an extended position along said longitudinal axis relative to said outer sleeve with said inner sleeve having a first end and an opposing second end and a series of threads disposed along at least a portion of said inner sleeve;
a screw coupled to said motor and extending outwardly from said motor along said longitudinal axis with said screw having a threaded exterior surface engaging said threads of said inner sleeve wherein rotation of said motor rotates said screw through said threads of said inner sleeve and facilitates said movement of said inner sleeve between said retracted and extended positions along said longitudinal axis; and
a stop mechanism limiting the movement of the inner sleeve relative to the outer sleeve in the extended position, said stop mechanism having a first portion associated with said outer sleeve and a second portion associated with said inner sleeve with said first and second portions abutting each other when said inner sleeve is in the extended position to define a hard stop;
wherein said first portion of said stop mechanism is further defined as a cap mounted to an end of said outer sleeve and wherein said second portion of said stop mechanism is further defined as a plurality of spaced apart tabs extending outwardly from an exterior surface of said inner sleeve with said plurality of spaced apart tabs abutting said cap when said inner sleeve is in said extended position; and
wherein said outer sleeve has an interior surface defined by a series of inwardly projecting flanges with said flanges being spaced apart to define a plurality of guide slots, with one of said tabs being disposed within each of said guide slots and said exterior surface of said inner sleeve between said tabs being disposed adjacent to said interior surface of said outer sleeve between said plurality of guide slots as said inner sleeve moves axially between said retracted and extended positions.

2. The linear actuator assembly as set forth in claim 1 wherein said screw is coupled to said housing and remains longitudinally fixed relative to said outer sleeve and said axis during said rotation of said screw.

3. The linear actuator assembly as set forth in claim 1 wherein said outer sleeve is fixed to said housing and remains longitudinally fixed relative to said housing during said movement of said inner sleeve.

4. The linear actuator assembly as set forth in claim 1 further including a planetary gear assembly disposed between said motor and said screw.

5. The linear actuator assembly as set forth in claim 1 further including a terminal end fitting mounted to said second end of said inner sleeve for movement with said inner sleeve as a unit between said retracted and extended positions.

6. The linear actuator assembly as set forth in claim 1 wherein said cap includes a shoulder with each of said plurality of tabs defining a shoulder with each of said shoulders of said tabs abutting said shoulder of said cap when said inner sleeve is in said extended position.

7. The linear actuator assembly as set forth in claim 1 wherein said inner sleeve includes a nut having a threaded interior surface defining said series of threads.

8. The linear actuator assembly as set forth in claim 7 wherein said inner sleeve includes a slot and wherein said nut is fixedly disposed within said slot such that said inner sleeve and said nut move as a unit during said movement of said inner sleeve between said retracted and extended positions.

9. The linear actuator assembly as set forth in claim 1 further including a protective shield coupled to said second end of said inner sleeve such that said shield and said inner sleeve move as a unit during said movement of said inner sleeve between said retracted and extended positions with said protective shield extending over an exterior surface of said outer sleeve during said movement of said inner sleeve between said retracted and extended positions.

10. The linear actuator assembly as set forth in claim 6 further comprising an adaptor coupled within said housing, wherein said plurality of tabs abut said adaptor when said inner sleeve is in said retracted position.

11. The linear actuator assembly as set forth in claim 10 wherein a section of said inner sleeve adjacent said first end of said inner sleeve is removed to define a gap in said inner sleeve such that said screw remains exposed and a gear remains engaged with said screw when said inner sleeve is in said retracted position.

12. The linear actuator assembly as set forth in claim 1 wherein said outer sleeve is mounted to and extends from said housing.

13. The linear actuator assembly as set forth in claim 1 wherein said inner sleeve has an inwardly projecting collar with a threaded surface defining said series of threads.

14. The linear actuator assembly as set forth in claim 13 wherein said collar is integrally formed with said inner sleeve.

15. A linear actuator assembly as set forth in claim 1 further including a bracket assembly comprising:
- a mount having a first arm and a second arm; and
- an actuator bracket rotationally mounted to said first arm and said second arm about a first pivot axis with said first pivot axis being transverse to said longitudinal axis and said housing being supported by said actuator bracket to permit said housing to rotate about said first pivot axis;
- said actuator bracket having a bearing defining a second pivot axis transverse to said longitudinal axis and said first pivot axis, and said housing having a journal rotatably mounted about said bearing to permit said housing to rotate about said second pivot axis.

* * * * *